Figure 1:
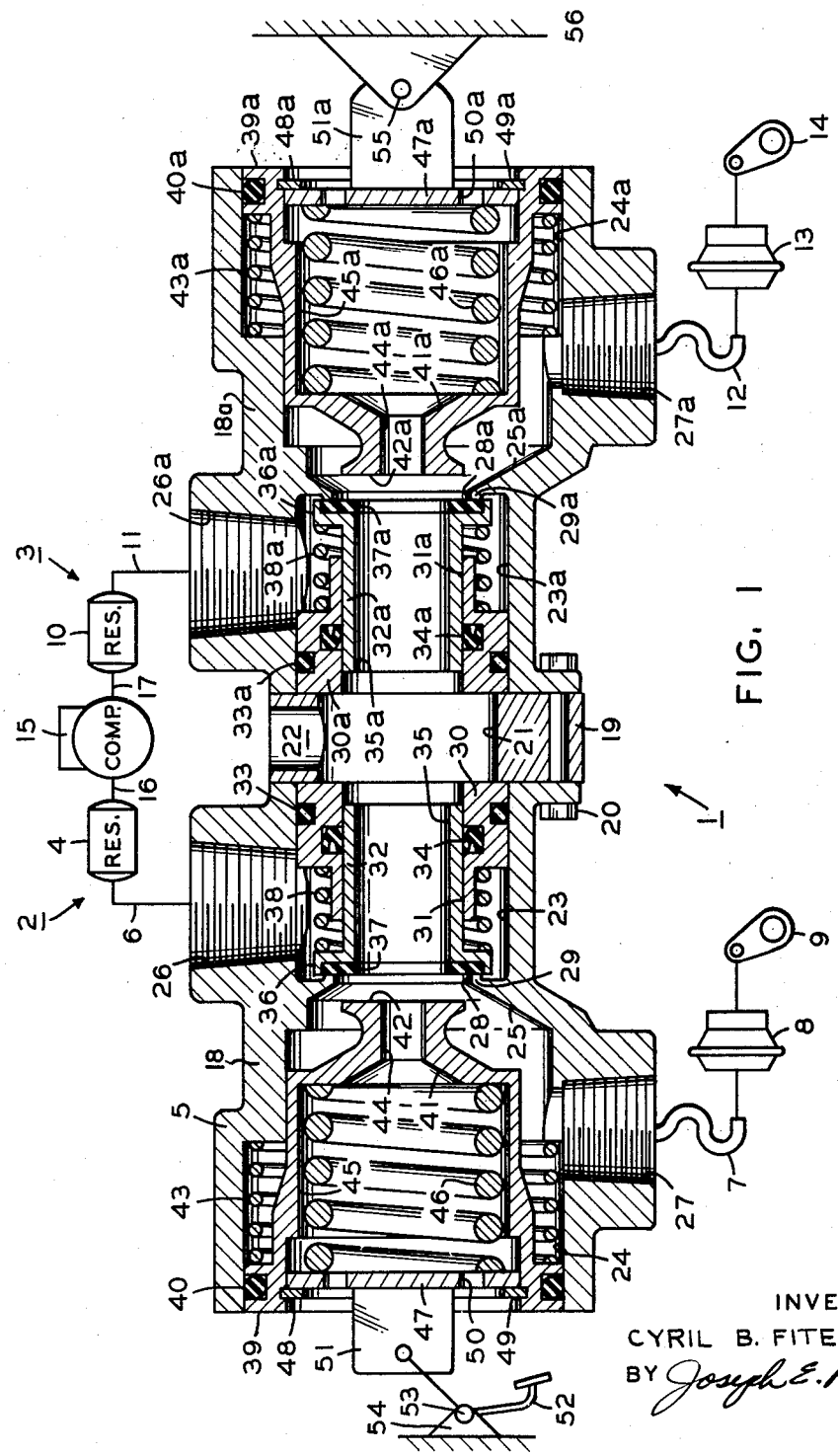

Sept. 1, 1964

C. B. FITES 3,147,047

CONTROL VALVE

Filed April 23, 1963

INVENTOR
CYRIL B. FITES
BY Joseph E. Papin

United States Patent Office 3,147,047
Patented Sept. 1, 1964

3,147,047
CONTROL VALVE
Cyril B. Fites, St. John, Mo., assignor to Wagner Electric Corporation, St. Louis, Mo., a corporation of Delaware
Filed Apr. 23, 1963, Ser. No. 274,985
12 Claims. (Cl. 303—52)

This invention relates to control valves and in particular to follow-up type, tandem control valves which control separate fluid pressure systems.

In the past, tandem control valves were provided with separate valve means therein for controlling pressure fluid flow in separate systems, and said separate valve means were actuated by separate valve control or actuation members which were interconnected by yoke-type linkage, or the like, with an operator pedal or treadle. One of the undesirable features of the past tandem control valves was that separate reaction forces, which provide "feel" as to the extent of the braking effort, were established on each of the valve control members for transmission to the operator treadle through the yoke-type linkage. Another undesirable feature was at the "feel" varied upon failure of fluid pressure in one of the separate systems effecting variation in controllability which tended to confuse the operator. Another undesirable feature was that an appreciable lost stroke in the operator treadle also accompanied the failure of fluid pressure in one of the separate systems. Still another undesirable feature was the requirement of an intermediate yoke-type connecting linkage between the separate valve control members and the operator treadle.

It is the object of the present invention to provide a control valve to overcome the aforementioned undesirable and objectional features, and this and other objects and advantages will become apparent hereinafter.

Briefly, the invention is embodied in a control valve including a housing, a pair of application means in said housing and defining therewith a pair of pressure fluid flow passages for connection between a pair of fluid pressure sources and a pair of fluid pressure responsive motors, one of said application means being connected with stationary means and the other of said application means being movable to urge said housing to a position establishing pressure fluid flow through said flow passages. The invention also includes the system for the abovementioned control valve.

The invention also consists in the parts and in the combination of parts hereinafter described and claimed. In the accompanying drawing which forms a part of the specification and wherein like numerals refer to like parts wherever they occur:

FIG. 1 is a diagrammatic view of a fluid pressure system showing the preferred embodiment of the present invention therein in cross section.

Referring now to FIG. 1, a dual brake actuating system 1 is shown having separate fluid pressure branches 2 and 3. The branch 2 includes a reservoir 4 for fluid pressure storage which is connected to one of a pair of separate inlet ports of a treadle actuated tandem control valve 5 by a conduit 6. The tandem control valve 5 is also provided with a pair of separate outlet ports, and a service line or conduit 7 connects one of said outlet ports with a brake chamber 8 which is operatively linked with a slack adjuster 9 to control the energization of a vehicle wheel brake assembly (not shown). The branch 3 includes a reservoir 10 for fluid pressure storage which is connected to the other inlet port of the tandem control valve 5 by a conduit 11, and another service line or conduit 12 connects the other of the outlet ports of said control valve with another brake chamber 13 which is operatively linked with another slack adjuster 14 to control the energization of another vehicle wheel brake assembly (not shown). To complete the system 1, a compressor 15 is connected to the reservoir 4 by a conduit 16 and connected to the reservoir 10 by a conduit 17, said compressor and separate reservoirs forming, in combination, separate fluid pressure sources.

The tandem control valve 5 is provided with a pair of similar housings 18, 18a having like component parts therein, as described hereinafter, and said housings 18, 18a have their base portions secured to a connection plate 19 by suitable means, such as a plurality of nut and bolt assemblies 20. The connection plate 19 is provided with an axial exhaust passage 21 which extends therethrough and which is connected to the atmosphere by a cross passage 22.

The housings 18, 18a are provided with bores 23, 23a and axially aligned stepped counterbores 24, 24a which define annular walls 25, 25a therebetween, said bores 23, 23a forming inlet chambers and said counterbores 24, 24a forming outlet chambers. Inlet ports 26, 26a are provided in the housings 18, 18a connecting with bores 23, 23a and receive conduits 6 and 11, respectively, as previously mentioned. Outlet ports 27, 27a are provided in the housings 18, 18a connecting with the counterbores 24, 24a and receiving conduits 7 and 12, respectively, as previously mentioned. Connecting passages 28, 28a are centrally provided through the housing walls 25, 25a between the bores 23, 23a and counterbores 24, 24a, and valve seats 29, 29a are provided on said walls 25, 25a in said bores 23, 23a and in circumscribing relation with said connecting passages 28, 28a.

Valve guide members 30, 30a are received in the lower end of the bores 23, 23a and are normally positioned in abutment with the opposed sides of the connecting plate 19. The valve guide members 30, 30a are provided with bores 31, 31a in which inlet valve elements 32, 32a are slidable, and seals 33, 33a and 34, 34a are carried by said valve guide members in sealing engagement with the housing bores 23, 23a and valve elements 32, 32a, respectively. The valve elements 32, 32a are provided with exhaust bores or openings 35, 35a which normally vent the counterbores 24, 24a to atmosphere through the connecting plate passage and cross-passage 21 and 22. Enlarged sealing heads 36, 36a are provided on the valve elements 32, 32a and include annular resilient seals or discs 37, 37a, and valve springs 38, 38a are provided between the valve guide members 30, 30a and the sealing heads 36, 36a. The compressive forces of the valve springs 38, 38a serve to urge the valve guide members 30, 30a into abutment with the connection plate 19, as previously mentioned, and normally urge the valve seals 37, 37a into sealing engagement with the valve seats 29, 29a on the housing walls 25, 25a to interrupt pressure fluid communication between the bores 23, 23a and counterbores 24, 24a, respectively.

Pistons or valve control members 39, 39a are slidably received in the counterbores 24, 24a, and seals 40, 40a are carried by said valve control members in sealing engagement with said counterbores. The pistons 39, 39a are provided with integral extensions 41, 41a having valve seats 42, 42a on the free end thereof, and said extensions are coaxial with the connecting passages 28, 28a in the housing walls 25, 25a. The valve seats 42, 42a are normally maintained in spaced relation with the valve seals 37, 37a of the valve elements 32, 32a by return springs 43, 43a interposed between the pistons 39, 39a and one of the shoulders formed in the counterbores 24, 24a. Auxiliary exhaust passages or bores 44, 44a are provided in the extensions 41, 41a and extend coaxially through the valve seats 42, 42a to connect with aligned counterbores 45, 45a in the pistons 39, 39a. Precompressed metering springs 46, 46a are biased between the shoulders formed at the intersection of piston bores 44, 44a and counterbores 45, 45a and force receiving plates 47, 47a which are slidable in said piston counterbores and retained therein against displacement by snap rings 48, 48a positioned in grooves 49, 49a adjacent the open end of said piston counterbores. A plurality of vent holes 50, 50a are provided through the plates 47, 47a, and connecting links 51, 51a are integrally formed on said plates. The link 51 is pivotally connected with an operator pedal, or the like, 52 which is pivotally mounted at 53 with a stationary support member 54, and the link 51a is pivotally connected at 55 with another stationary support member 56.

In the operation of the above described control valve 5 in the system 1, it is preferred to predetermine substantially simultaneous actuation of the system branches 2 and 3 by effecting substantially simultaneous opening of the valve elements 32, 32a which respectively control said branches. This is accomplished by substantially balancing the magnitude of the combined forces of the valve and return springs 38 and 43 and the seating force of the fluid pressure in the inlet chamber 23 acting to maintain the valve element 32 in engagement with the valve seat 29 against the magnitude of the combined forces of the valve and return springs 38a and 43a and the seating force of the fluid pressure in the inlet chamber 23a acting to maintain the valve element 32a in engagement with the seat 29a.

Assuming that these forces are substantially balanced, as above described, a manual force applied by the operator on the pedal 52 rotates said pedal about the pivot 52 to transmit said applied force to the piston 39 through the plate 47 and the metering spring 46. This applied force initially moves the piston 39 rightwardly in the outlet chamber 24 against the compressive force of the return spring 43 which, in turn, effects rightward movement of the housings 18, 18a in follow-up relation against the compressive force of the return spring 43a. Since the return springs 43, 43a are substantially balanced, as previously mentioned, the follow-up rightward movement of housings 18, 18a moves the valve element 32a into engagement with the piston valve seat 42a substantially at the same time that the piston valve seat 42 is moved into engagement with the valve element 32 by the rightward movement of the piston 39. In this manner, the exhaust openings 35, 35a of the valve elements 32, 32a and the exhaust passages 44, 44a of the pistons 39, 39a are closed to interrupt pressure fluid communication between the outlet chambers 24, 24a and the atmosphere. Further rightward movement of the housings 18, 18a serves to disengage the valve element 32 from the seat 29 and to disengage the valve seat 29a from the valve element 32a to establish pressure fluid communication between inlet and outlet chambers 23, 23a and 24, 24a, respectively. In this manner, pressure fluid flows from the reservoir 4 through the conduit 6, the inlet port 26, the inlet chamber 23, the connecting passage 28, the outlet chamber 24, the outlet port 27, and the service line 7 to actuate the brake chamber 8 which, in turn, rotates the slack adjuster 9 to energize the wheel brake assembly associated therewith. At the same time, pressure fluid also flows from the reservoir 10 through the conduit 11, the inlet port 26a, the inlet chamber 23a, the connecting passage 28a, the outlet chamber 24a, the outlet port 27a, and the service line 12 to actuate the brake chamber 13 which, in turn, rotates the slack adjuster 14 to energize the wheel brake assembly associated therewith. It should be noted that the forces established by fluid pressure acting on the effective areas of the housings 18, 18a and component parts in the inlet chambers 23, 23a are self-cancelling and that the reaction forces established by fluid pressure acting on the effective cross-sectional area of the housings 18, 18a in the outlet chambers 24, 24a are equal and opposite and thereby self-cancelling. In view of the above, it is apparent that the fluid pressures metered to the outlet chambers 24, 24a are substantially equal in magnitude.

When the reaction forces created by the established fluid pressures in the outlet chambers 24, 24a acting on the effective areas of the pistons 39, 39a each equal the manually applied force, said pistons are moved against their metering springs 46, 46a so that the valve elements 32, 32a are moved into lapped engagement with their seats 29, 29a and the piston valve seats 42, 42a are positioned in lapped engagement with the valve elements 32, 32a. The reaction force acting through the metering spring 46 against the manually applied force on the plate 47 is substantially equal and opposite thereto and affords the operator an accurate and direct "feel" as to the extent of the braking effort or applications. If greater braking effort is desired, the manually applied force is increased which results in an increased application force, and the component parts of the control valve 5 function in the same manner as previously described to again move their component parts to their lapped positions.

When the desired braking effort is attained, the manually applied force is removed from the pedal 52, and the reaction force on the piston 39 and the return spring 43 moves the piston 39 leftwardly toward its original position in the housing 18 while the metering spring 46 returns the plate 47 leftwardly to its original position. This leftward movement of the piston 39 disengages the piston seat 42 from the valve element 32 to open the exhaust passages 35 and 44 and re-establish communication between the outlet chamber 24 and the atmosphere. In this manner, the wheel brake assembly associated with the brake chamber 8 is de-energized and the reaction forces acting on the piston 39 and the housing 18 are eliminated by exhausting fluid pressure from the brake chamber through the service line 7, the outlet port 27, the outlet chamber 24, the connecting passage 28, the exhaust passage 35 of the valve element 32, the bore 31 of the guide member 30 and the passage and cross passage 21 and 22 of the connecting plate 17 to the atmosphere. At the same time the reaction force on the housing 18a and the return spring 43a moves the housings 18, 18a leftwardly toward their original positions in follow-up relation with the piston 39. This leftward movement of the housings 18, 18a disengages the valve element 32a from the piston seat 42a to open the exhaust passages 35a and 44a and re-establish communication between the outlet chamber 24a and the atmosphere. In this manner, the wheel brake assembly associated with the brake chamber 13 is also de-energized and the reaction forces acting on the piston 39a and the housing 18a are eliminated by exhausting fluid pressure from said brake chamber through the service line 12, the outlet port 27a, the outlet chamber 24a, the connecting passage 28a, the exhaust opening 35a of the valve element 32a, the bore 31a of the guide member 30a, and the passage and cross passage 21 and 22 of the connecting plate to the atmosphere. Upon the elimination of the reaction force acting on the piston 39a, the metering spring 46a returns said piston to its original position.

In the event of failure of the branch 2 with the resultant loss of the fluid pressure in the reservoir 4, the manually applied force moves the piston 39 and housings 18, 18a rightwardly to actuate the valve elements 32, 32a as previously described. Since it is assumed that the branch 2 has failed, the establishment of fluid pressure in said branch is, of course, obviated; however, fluid pressure flow is established in the branch 3 to actuate the brake chamber 13 and energize the wheel brake assembly associated therewith. The fluid pressure so established in the outlet chamber 24a acts on the effective cross-sectional area of the housing 18a in the outlet chamber creating a reaction force to move the housings 18, 18a leftwardly so that the shoulder formed at the juncture of the counterbore 24 and housing wall 25 is moved into abutment with the piston 39; however, this leftward movement of the housings 18, 18a permits the valve element 32a to close. It is now necessary for the operator to slightly increase the pedal stroke to effect concert rightward movement of the piston 39 and housings 18, 18a to again disengage the valve seat 29a from the valve element 32a to further meter fluid pressure to the brake chamber 13. Since the piston 39 is abuttingly engaged with the housing 18, the reaction force is directly opposed to the manually applied force to afford the operator a direct and accurate "feel" as to the extent of the braking application. It should be noted that the lost or increased pedal stroke is maintained at a minimum upon failure of the branch 2. In other words, the lost stroke represents only the movement of the housing 18 into engagement with the piston 39 after the valve element 32a is initially opened.

In the event of failure of the branch 3 with a resultant loss of the fluid pressure in the reservoir 10, the manually applied force moves the piston 39 and housings 18, 18a rightwardly to actuate the valve elements 32, 32a, as previously described. Since it is assumed that the branch 3 has failed, the establishment of fluid pressure in the branch is obviated; however, fluid pressure is established in the branch 2 to actuate the brake chamber 8 and energize the wheel brake assembly associated therewith. The fluid pressure so established in the outlet chamber 24 acts on the effective area of the housing 18 in the outlet chamber 24 creating a force to move the housings 18, 18a rightwardly so as to engage the shoulder formed at the juncture of the counterbore 24a and housing wall 25a with the piston 39a; however this rightward movement permits the valve element 32 to close. It is now necessary for the operator to slightly increase the pedal stroke to effect further rightward movement of the piston 39 to further actuate the valve element 32 and meter fluid pressure to the brake chamber 8. The fluid pressure metered to the brake chamber 8 also acts on the effective area of the piston 39 in the outlet chamber 24 to create a reaction force substantially equal and opposite to the manually applied force thereby affording the operator a direct and accurate "feel" as to the extent of the braking application. It should be noted that the lost stroke or increased pedal stroke is maintained at a minimum upon failure of the branch 3. In other words, the lost stroke represents only the movement of the housing 18a into engagement with the piston 39a after the valve element 32 is initially opened.

In the above described operation of the control valve 5 in the system 1, the substantially simultaneous actuation of the system branches 2 and 3 or the opening of the valve elements 32, 32a has been predetermined by substantially balancing the magnitudes of the combined forces of the valve and return springs 38 and 43 and the seating force of the valve element 32 of the combined forces of the valve and return springs 38a and 43a and the seating force of the valve element 32a. It therefore follows that if the magnitudes of the combined forces are predeterminately unbalanced it is possible to predeterminately sequence the actuation of system branches 2 and 3 or the opening of valve elements 32, 32a. This sequenced operation of the control valve 5 is substantially the same as that described above for the balanced operation of the control valve except that the manually applied force on the piston 39 will effect the opening of only one of the valve elements 32, 32a, and the fluid pressure metered into the outlet chamber 24 or 24a by the opened valve element will act on the effective area of the housings 18 or 18a in said counterbores to move said housings in a direction to unseat the valve seats 29 or 29a from the other of the valve elements 32 or 32a. In this manner, the valve elements 32, 32a are opened in sequence and fluid pressure flow is sequentially established in the branches 2 and 3. Further, it is obvious that the fluid pressure first metered by the first opened valve will act on the effective areas of the housings 18 or 18a in the counterbores 24 or 24a creating a force to move said housings 18, 18a to a position tending to lap the first opened valve element and at the same time, open the other or thus far unactuated valve element. It is apparent that the last opened valve element will meter a fluid pressure having a lesser magnitude than that metered by the first opened valve element due to the predetermined proportional differences in the magnitudes of the above discussed forces which control the sequential opening of said valve elements.

From the foregoing, it is now apparent that a novel control valve meeting the objects set out hereinbefore is provided and that changes or modifications as to the precise configurations, shapes or details of the constructions set forth in the disclosure by way of illustration may be made by those skilled in the art without departing from the spirit of the invention as defined by the claims which follow.

What I claim is:

1. A self-lapping control valve for fluid pressure comprising a movable housing having a pair of sets of ports therein, each port set including inlet and outlet ports, a pair of valve means controlling pressure fluid communication between the ports of said port sets, respectively, a pair of opposed valve control members in said housing for engagement with said valve means, one of said valve control members being movable in response to an applied force thereon to engage and move one of said valve means to a position establishing pressure fluid communication between the ports of one of said port sets, the other of said valve control members being connected with stationary support means, and resilient means for effecting movement of said housing in response to movement of said one valve control member, said housing being initially movable to engage the other of said valve means with said other valve control member and thereafter movable relative to said other valve means and valve control member to a position establishing pressure fluid communication between the ports of the other of said port sets substantially simultaneously with that established between the ports of said one port set.

2. A self-lapping control valve for fluid pressure comprising a movable housing having a pair of sets of ports therein, each port set including inlet and outlet ports, a pair of valve means normally establishing pressure fluid communication between the outlet ports of said port sets and the atmosphere and interrupting pressure fluid communication between the inlet and outlet ports of said port sets, respectively, a pair of opposed valve control members in said housing for engagement with said valve means, one of said valve control members being movable in response to an applied force thereon into engagement with one of said valve means to move said one valve means to a position interrupting pressure fluid communication between the outlet port of one of said port sets and the atmosphere and establishing pressure fluid communication between the inlet and outlet ports of said one port set, the other of said valve control members being connected with stationary support means, and resilient means biased between said one valve control member and housing to effect substantially simultaneous movement of said housing with said one valve control means and move the other of said valve means to a position in engagement with said other valve control member interrupting pressure fluid communication between the outlet port of the other of said port sets and the atmosphere, said housing being subsequently movable relative to said other valve means and other valve control member to a position establishing pressure fluid communication between the inlet and outlet ports of said other port sets substantially simultaneously with that established between the inlet and outlet ports of said one port set.

3. A self-lapping control valve for fluid pressure comprising a movable housing having a pair of sets of ports therein, each port set including inlet and outlet and exhaust ports, a pair of valve means normally interrupting pressure fluid communication between the inlet and outlet ports of said port sets, respectively, a pair of opposed valve control members in said housing for engagement with said valve means, a pair of exhaust openings in said valve means normally establishing pressure fluid communication between the outlet and exhaust ports of said port sets, respectively, one of said exhaust openings being closed upon movement of one of said valve control members in response to an applied force thereon into engagement with one of said valve means to interrupt pressure fluid communication between the outlet and exhaust ports of one of said port sets and said one valve means being thereafter moved by said one valve control means to a position establishing pressure fluid communication between the inlet and outlet ports of said one port set, the other of said valve control members being connected with stationary support means, and resilient means biased between said housing and one valve control means to effect follow-up movement of said housing in response to the movement of said one valve control member, said housing being initially movable to engage the other of said valve means with said other valve control member closing the other of said exhaust openings and interrupting pressure fluid communication between the outlet and exhaust ports of the other of said port sets and said housing being thereafter movable relative to said other valve means to a position establishing pressure fluid communication between the inlet and outlet ports of said other port set substantially simultaneously with that established between the inlet and outlet ports of said one port set.

4. A control valve for fluid pressure comprising a movable housing having a pair of sets of chambers therein, each chamber set including inlet and outlet chambers, a pair of valve seats in said inlet chambers and having a pair of passages formed therethrough between the chambers of said chamber sets, respectively, a pair of valve means normally urged into engagement with said valve seats to interrupt communication between the chambers of said chamber sets, a pair of valve control members slidable in the outlet chambers of said chamber sets for engagement with said valve means, a pair of exhaust openings in said valve means normally communicating the outlet chambers of said chamber sets with the atmosphere, one of said exhaust openings being closed upon movement of one of said valve control members in response to an applied force thereon into engagement with one of said valve means and said one valve control member being thereafter movable to disengage said one valve means from one of said valve seats to open communication between the chambers of said one chamber set through one of said passages, the other of said valve control members being connected with stationary support means, and resilient means biased between said one valve control member and said housing to move said housing in follow-up relation with said one valve control member, said housing being initially movable to engage the other of said valve means with said other valve control member and close the other of said exhaust openings and said housing being subsequently movable to disengage the other of said valve seats from said other valve means to open communication between the chambers of the other of said chamber sets through the other of said passages.

5. A control valve for fluid pressure comprising a movable housing having first and second inlet and outlet chambers therein, an exhaust chamber between said first and second inlet chambers, first and second valve seats in said first and second inlet chambers, first and second connecting passages extending through said first and second valve seats between said first and second inlet and outlet chambers, respectively, first and second valve means normally biased into engagement with said first and second valve seats to interrupt communication between said first and second inlet and outlet chambers, respectively, first and second exhaust openings in said first and second valve means normally communicating said first and second outlet chambers with said exhaust chamber, first and second valve control members slidable in said first and second outlet chambers, first and second extension on said first and second valve control members for movement through said first and second passages, third and fourth valve seats on said first and second extensions for engagement with said first and second valve means, said first valve control member being initially movable in response to an applied force thereon to engage said third valve seat with said first valve means and close said first exhaust opening interrupting communication between said first outlet chamber and said exhaust chamber and said first valve control member being subsequently movable to disengage said first valve means from said first valve seat establishing communication between said first inlet and outlet chambers, said second valve control member being connected with stationary support means, and first and second springs in said first and second outlet chambers biased between said first valve control member and housing and between said second valve control member and housing, said first spring being compressible upon movement of said first valve control member to move said housing in follow-up relation therewith and relative to said second valve control means against said second spring, said housing being initially movable to move said second valve means into engagement with said fourth valve seat to close said second exhaust opening and interrupt communication between said second outlet chamber and said exhaust chamber and said housing being subsequently movable relative to said second valve means and second valve control member to disengage said second valve seat from said second valve means establishing communication between said second inlet and outlet chambers.

6. A control valve for fluid pressure comprising a movable housing having a first bore and counterbore aligned with a second bore and counterbore therein, an exhaust chamber between said first and second bores, first and second radially extending walls integrally formed with said housing between said first bore and counterbore and said second bore and counterbore, first and second valve seats on said first and second walls and facing said first and second bores, first and second connecting passages in said first and second walls and extending through said first and second valve seats between said first and second bores and counterbore, first and second inlet and outlet ports in said housing and connected with said first and second bores and counterbores, first and second valve means in said first and second bores and normally biased into engagement with said first and second valve seats to interrupt communication between said first and second inlet and outlet ports, respectively, first and second exhaust openings in said first and second valve means and normally communicating said first and second outlet ports with said exhaust chamber, first and second piston means slidable in said first and second counterbores, said first piston means being connected externally of said housing with force applying means and said second piston means being connected externally of said housing with a stationary support, third and fourth valve seats on said first and second piston means for engagement with said first and second valve means, said first piston means being initially movable in response to an applied force to engage said third valve seat with said first valve means to close said first exhaust opening and interrupt communication between said first outlet port and exhaust chamber and said first piston means being subsequently movable to disengage said first valve means from said first valve seat and establish communication between said first inlet and outlet ports, and first and second springs in said first and second counterbores biased between said first piston means and housing and between said second piston means and housing, said first spring means being compressible upon the movement of said first piston means to move said housing against said second spring in follow-up relation with said first piston means, said housing being initially movable relative to said second piston means to move said second valve means into engagement with said fourth valve seat to close said second exhaust opening and interrupt communication between said second outlet port and exhaust chamber and said housing being subsequently movable relative to said second valve means to disengage said second valve seat therefrom and establish communication between said second inlet and outlet ports.

7. A fluid pressure system comprising a pair of fluid pressure sources, a pair of fluid pressure responsive servo motors, a pair of conduit means respectively interconnected between said sources and servo motors, and means for controlling the flow of pressure fluid from said sources to said servo motors including a movable housing, a pair of valve control members in said housing, one of said valve control members being movable in said housing in response to an applied force thereon and the other of said valve control members being connected with a stationary support member, means within said housing including said valve control members providing a pair of separate pressure fluid flow passage means respectively connected in said conduit means, a pair of valve means in said flow passage means normally interrupting pressure fluid flow therethrough between said sources and servo motors and venting said servo motors to the atmosphere, said one valve control member being movable in response to the applied force into engagement with one of said valve means to move said one valve means to a position interrupting communication between one of said servo motors and the atmosphere and establishing pressure fluid flow through one of said conduit means and flow passage means from one of said sources to said one servo motor, and resilient means biased between said one valve control member and housing to move said housing in follow-up relation with said one valve control member, said housing being initially movable to engage the other of said valve means with said other valve control member to interrupt communication between the other of said servo motors and the atmosphere and said housing being subsequently movable relative to said other valve means and valve control member to establish pressure fluid flow through the other of said conduit means and flow passage means between the other of said sources and said other servo motor.

8. A self-lapping control valve for controlling the application of fluid pressure from a pair of fluid pressure sources to a pair of fluid pressure responsive motors comprising a movable housing, a pair of opposed application means in said housing, one of said application means being connected with stationary support means, means within said housing including said application means providing a pair of pressure fluid flow passages for respectively connecting said sources and motors, the other of said application means being movable in response to an applied force to a position establishing pressure fluid flow through one of said flow passages, and resilient means for effecting movement of said housing in response to the movement of said other application means, said housing being movable relative to said one application means to a position establishing pressure fluid flow through the other of said flow passages substantially simultaneous with that established through said one flow passage.

9. A self-lapping control valve for controlling the application of fluid pressure from a pair of fluid pressure sources to a pair of fluid pressure responsive motors comprising a movable housing, a pair of opposed valve control members in said housing, one of said valve control members being connected with stationary support means, means in said housing including said valve control members providing a pair of pressure fluid flow passages for respectively connecting said sources and motors, a pair of valve means in said flow passages controlling pressure fluid flow therethrough, the other of said valve control being movable in response to an applied force to engage and move one of said valve means to a position establishing pressure fluid flow through one of said flow passages, and resilient means for effecting movement of said housing in response to the movement of said other valve control member, said housing being movable relative to said one valve control member to a position engaging the other of said valve means with said one valve control member and establishing pressure fluid flow through the other of said flow passages substantially simultaneously with that established through said one flow passage.

10. A self-lapping control valve comprising a movable housing, a pair of opposed valve control members in said housing, one of said valve control members being connected with stationary support means, means within said housing including said valve control members providing a pair of pressure fluid flow passages for respective connection between a pair of fluid pressure sources and a pair of fluid pressure responsive motors, a pair of valve means normally biased to a closed position in said flow passages interrupting pressure fluid flow therethrough, the other of said valve control members being movable in response to an applied force to engage and move one of said valve means to an open position in one of said flow passages establishing pressure fluid flow through said one flow passage, and resilient means for effecting movement of said housing relative to said one valve control member in response to the movement of said other valve control member, said housing being initially movable to engage the other of said valve means with said one valve control member and subsequently movable relative to said other valve means and one valve control member to a position opening the other of said flow passages and establishing pressure fluid flow therethrough substantially simultaneously with that established in said one flow passage.

11. A self-lapping control valve comprising a movable housing, a pair of opposed valve control members slidable in said housing, one of said valve control members being connected with stationary support means, means within said housing including said valve control members providing a pair of pressure fluid flow passages for respective connection between a pair of fluid pressure sources and a pair of pressure fluid responsive motors, a pair of valve means normally urged to a closed position in said flow passages interrupting pressure fluid flow therethrough, a pair of exhaust openings in said valve means normally venting the portions of said flow passages connected with said motors to the atmosphere, the other of said valve control members being initially movable in response to an applied force into engagement with one of said valve means to close the exhaust opening therein and subsequently move said one valve means to an open position in one of said flow passages establishing pressure fluid flow therethrough, and resilient means biased between said other valve control member and housing to substantially effect follow-up movement of said housing in response to the movement of said other valve control member, said housing being initially movable to engage the other of said valve means with said one valve control member closing the exhaust opening in said other valve means and said housing being subsequently movable relative to said other valve means and one valve control member to a position opening the other of said flow passages and establishing pressure fluid flow through said other flow passage in a time sequence substantially simultaneous with the establishment of pressure fluid flow through said one flow passage.

12. A fluid pressure system comprising a pair of fluid pressure sources, a pair of fluid pressure responsive motors, a pair of conduit means respectively connected between said sources and motors, and means for controlling the flow of pressure fluid from said sources to said motors including a movable housing, a pair of opposed self-lapping application means in said housing respectively connected with force applying means and stationary support means, means within said housing including said application means providing a pair of pressure fluid flow passages respectively connected in said conduit means, one of said application means being movable in response to a force applied thereon by said force applying means to a position establishing pressure fluid flow from one of said sources to one of said motors through one of said flow passages and conduit means, and resilient means for effecting movement of said housing in response to the movement of said one application means, said housing being movable relative to the other of said application means to a position establishing pressure fluid flow from the other of said sources to the other of said motors through the other of said flow passages and conduit means in a time sequence substantially simultaneous with that established through said one flow passage and conduit means.

References Cited in the file of this patent

UNITED STATES PATENTS

| | | |
|---|---|---|
| 1,868,725 | Bragg et al. | July 26, 1932 |
| 3,003,825 | Kemble | Oct. 10, 1961 |

FOREIGN PATENTS

| | | |
|---|---|---|
| 732,959 | Great Britain | June 29, 1955 |